May 8, 1928.

H. R. STUART

OSCILLATING FAN

Filed May 21. 1926

1,668,989

INVENTOR
Harve R. Stuart
BY
ATTORNEYS

Patented May 8, 1928.

1,668,989

UNITED STATES PATENT OFFICE.

HARVE R. STUART, OF SPRINGFIELD, OHIO, ASSIGNOR TO THE ROBBINS AND MYERS COMPANY, OF SPRINGFIELD, OHIO, A CORPORATION OF OHIO.

OSCILLATING FAN.

Application filed May 21, 1926. Serial No. 110,790.

This invention relates to improvements in electric fans of the oscillating type, it more particularly relating to the manner of supporting the oscillating mechanism.

The object of the invention is to improve the manner of supporting the oscillating mechanism whereby, first, a more rigid support for the mechanism is obtained, enabling the parts of the mechanism to be reduced in size; second, whereby the mechanism may be inspected without the necessity of removal or disturbing its bearing supports; and, third, whereby a more symmetrical appearance is lent to the motor casing.

Figure 1:
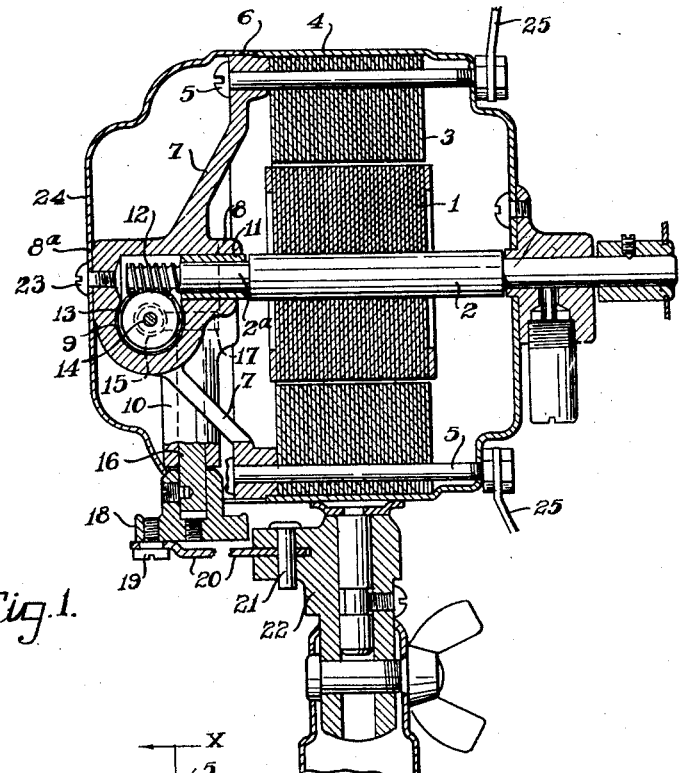
Fig. 1 is a vertical section of an electric motor showing my improvements, the section being on the line x—x of Fig. 2.
Figure 2:
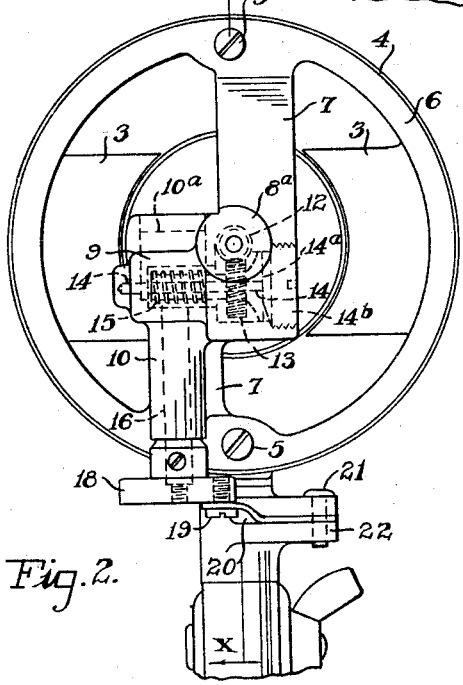
Fig. 2 is an end view with a portion of the casing removed showing the support with the oscillating mechanism.
Figure 3:
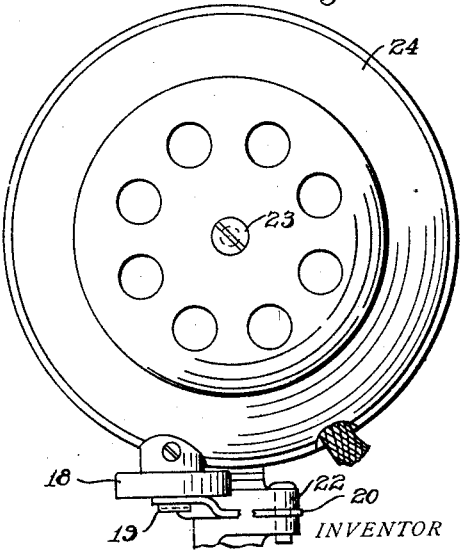
Fig. 3 is an end view with the removable portion of the casing in place.

Referring to the drawings, 1 represents the rotor, 2 the rotor shaft, 3 the stator, and 4 the main casing of an electric motor. Secured to the stator 3 by a pair of bolts 5 is a bracket formed to support the oscillating mechanism. This bracket consists of an annular ring 6, a pair of integral arms 7 and three integrally formed bearing housings, one of which, 8, extends longitudinally, another, 9, extends transversely, and another, 10, is arranged vertically. A bushing 11 is inserted in the forward portion of the bore of the housing 8 to receive the reduced portion $2^a$ of the shaft 2 and provide a bearing for the shaft and the rear portion of the bore accommodates a worm 12 on the extreme rear end of the shaft. The housing 9 has a bore to receive a worm wheel 13 loosely mounted on a shaft 14, and driven by the worm 12, and having connected therewith a worm 15 located in a reduced portion of the bore. The shaft 14 has a spacing disk $14^a$ connected with one end thereof and located in the large portion of the bore, the outer end of which is closed by a plug $14^b$; the other end of the shaft having a bearing in the opposite end of the housing. The vertical bearing housing 10 has a bore to receive a shaft 16, the upper end of which has connected therewith a worm wheel 17 located in an enlarged portion of the bore of the housing, the upper end of which is closed by a plug $10^a$. This worm wheel 17 meshes with the worm 15. Connected to the lower end of the shaft 16 is a disk 18 having an eccentric screw 19 which serves to pivotally connect a link 20 with the disk, the other end of the link being pivotally connected by the pin 21 to a stationary part 22 of the supporting standard. The rear end of the bearing housing 8 is provided with a flat circular face $8^a$ and to this face is attached by a screw 23 a cap 24 fitted at its outer extremity to the periphery of the ring portion 6 of the bracket, this cap forming in effect an extension of the main casing 4.

The screws 5 which secure the supporting bracket to the stator also serve to secure the casing member 4 in position and to further secure in position the fan guard, portions of which are indicated at 25.

By this arrangement it will be seen that the oscillating mechanism for the fan is assembled as a unit upon the bracket which is secured directly to the frame or stator of the motor and forms the sole means of supporting the oscillating mechanism. The cap 24 merely serves to cover the rear end of the motor and the bracket carrying the oscillating mechanism and may be readily removed for inspection by removing the screw 23, this screw serving merely to hold the cap in position. This arrangement not only provides a rigid support for the oscillating mechanism, but also permits it to be enclosed in the casing of the motor so that the casing may present a symmetrical appearance, and further eliminate the necessity of employing the casing in any manner as a support for the oscillating mechanism. Further, by rigidly supporting the parts of the mechanism in close relation to the rotor, the size of the parts thereof may be materially reduced with a consequent economy in manufacture. Further, the mechanism may be readily inspected without removal or without disturbing its bearing supports, and if desired the entire oscillating mechanism may be readily taken apart.

Having thus described my invention, I claim:

In an oscillating mechanism, a motor and its shaft mounted to oscillate, a bracket secured to a stationary part of said motor, a longitudinally arranged housing formed integrally with said bracket provided with a single bearing at its inner end to receive said motor shaft with the shaft extending beyond said bearing, a worm located in said housing and connected with said shaft extension, a transversely arranged housing integrally formed with said bracket and with said longitudinal housing and communicating with said longitudinal housing and having a bearing at its inner end and formed open at its outer end, a second shaft journaled in said bearing, a spacing disk supporting the outer end of said shaft, a plug closing the outer end of said transverse housing, a worm wheel on said second shaft in mesh with said worm, a worm connected with said second shaft, a third vertically arranged housing integrally formed with said bracket and the other two housings, a third shaft journaled in said vertical housing, a worm wheel connected with said third shaft and located in said vertical housing meshing with the worm on said second shaft, and a removable cover enclosing said brackets and its housing.

In testimony whereof, I have hereunto set my hand this 20th day of May, 1926.

HARVE R. STUART.